United States Patent Office 3,719,640
Patented Mar. 6, 1973

3,719,640
POLY (AMIDE-IMIDE)POLYMERS HAVING RECURRING DIKETOPIPERAZINE GROUPS
Lester T. C. Lee, Parsippany, N.J., and Stephen S. Hirsch, New City, N.Y., assignors to Allied Chemical Corporation, New York, N.Y.
No Drawing. Continuation-in-part of abandoned application Ser. No. 39,509, May 21, 1970. This application July 21, 1971, Ser. No. 164,933
Int. Cl. C08g 20/32
U.S. Cl. 260—78 A         10 Claims

ABSTRACT OF THE DISCLOSURE

Novel linear polymers containing recurring diketopiperazine groups are prepared by polymerizing the salt of a diamine and a nitrilotricarboxylic acid having the formula $HOOCRN(CH_2COOH)_2$ wherein R is a phenylene or alkylene radical. The polymers contain quaternizable tertiary nitrogen atoms which impart valuable properties to the polymers. The polymers may be formed into fibers, films and shaped articles, and may be blended with other polymers to improve their properties.

---

This is a continuation-in-part of our copending application Ser. No. 39,509, filed May 21, 1970, now abandoned.

This invention provides novel linear polymers having recurring units of the formula

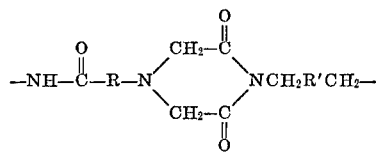

wherein R represents a phenylene or alkylene radical and R' represents a covalent bond or a divalent organic radical.

A particularly distinguishing feature of the polymers of this invention is that the tertiary nitrogen atom attached to the group designated R in the above formula is quaternizable, thereby imparting many valuable properties to the polymers. For example, due to these nitrogen atoms the polymers of this invention are hygroscopic, being capable of absorbing over half their weight in water when exposed to air of 100% relative humidity at room temperature. Being hygroscopic, the polymers may be used as separatory membranes in such processes as desalination. The polymers may also be used as basic ion exchange resins. The polymers, which have a pH of about 9, may be used as such resins either as they are or after they have been quaternized with a lower alkyl or metal halide. The quaternized polymers are polyelectrolytes and may be used as antistatic agents, as for example, by being blended in a minor amount with another polymer, particularly a polyamide such as nylon-6 or nylon 6/6. The quaternizable nitrogen atoms also render the polymers soluble in such common polar solvents as dimethylformamide, dimethylsulfoxide, and tetrahydrofuran. As a result, the polymers can conveniently be used to form adhesive compositions comprising a solution of the polymer in such a solvent. In addition to the above properties attributable to the quaternizable nitrogen atoms, the polymers of this invention also have excellent high temperature properties, having high glass transition temperatures and good thermal stability although melt processable. The polymers can be formed into fibers and films by conventional solution methods as well as by conventional melt methods.

The polymers of this invention are prepared by polymerizing the salt of nitrilotricarboxylic acid having the formula $HOOCRN(CH_2COOH)_2$ wherein R is a phenylene or alkylene radical and a diamine having the formula $H_2NCH_2R'CH_2NH_2$ wherein R' is a covalent bond or a divalent organic radical. The polymerization is carried out by maintaining the salt at an elevated temperature, generally between about 200° C. and 350° C., until a polymer of film of fiber-forming molecular weight is obtained. The time required for such polymerization is normally about one hour or more, up to about seven hours. The polymerization is preferably carried out under an inert atmosphere, such as nitrogen, and also under reduced pressure to facilitate removal of the water of condensation or to allow for its expansion in a closed system.

If desired, polymerization of the salt can be carried out in the presence of an inert solvent. However, if a solvent is employed, it is essential that the salt be preformed, otherwise a linear polymer containing free carboxyl groups instead of imide linkages is obtained. For example, when a solution of nitrilotriacetic acid and hexamethylene diamine in xylene is refluxed for several hours, the resultant polymer is a linear polymer having free carboxyl groups and containing no imide linkages. Unlike the polymers of this invention, such polymers are acidic and therefore cannot be quaternized.

The salt employed in the polymerization is readily prepared by dissolving a substantially 1:1 molar ratio of the nitrilotricarboxylic acid and the diamine in an inert polar organic solvent. Suitable inert polar organic solvents include dimethylformamide, dimethylacetamide, dimethylsulfoxide, tetrahydrofuran, and the like. Dimethylformamide gives especially good results. The salt is preferably formed under substantially anhydrous conditions. The salt normally forms immediately and is recovered from the solvent in accordance with conventional methods, such as by filtration. Formation of the salt is represented by the following equation:

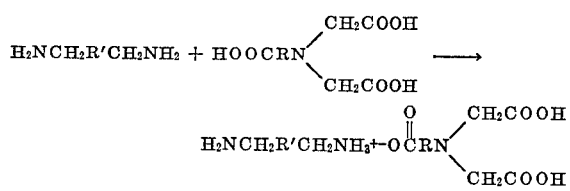

Except when R is methylene, polymerization of the salt produces a poly(amide-imide) in which the amide and imide linkages alternate. When R is methylene, the amide and imide linkages, although essentially equal in number, do not necessarily alternate. Spectral evidence indicates that during polymerization of a salt of nitrilotriacetic acid and a diamine in accordance with this invention, either of the two free carboxyl groups of the salt is capable of forming a cyclic imide group with the carboxylate group forming the salt, as well as being capable of forming a cyclic imide group with the other free carboxyl group of the salt. Hence, in the polymers of this invention wherein R is methylene, the amide and imide linkages are randomly arranged such that each amide linkage has adjacent to it either two imide linkages or one amide linkage and one imide linkage, and vice versa. For example, the following is a typical arrangement: amide-imide-imide-amide-amide-imide-amide-amide-etc.

Nitrilotricarboxylic acids suitable for use in this invention have the formula $HOOCRN(CH_2COOH)_2$ wherein R is a phenylene radical or an alkylene radical having 1 to 6 carbon atoms. As used herein, the term "alkylene radical" refers to alkyl diradicals having the general formula $-C_nH_{2n}-$. Especially good results are obtained using nitrilotriacetic acid.

A particularly advantageous feature of this invention is that it permits the preparation of valuable linear polymers containing recurring diketopiperazine groups from diamines and nitrilotricarboxylic acids such as nitrilotriacetic acid, which is an inexpensive, commercially available compound.

Diamines useful in this invention have the formula $H_2NCH_2R'CH_2NH_2$ wherein R' is a divalent organic radical, in particular, an aliphatic, aromatic, or aliphatic-aromatic diradical or substituted derivative of such diradicals. Suitable aliphatic diamines include straight chain aliphatic diamines, such as 1,10-diaminodecane, branched chain aliphatic diamines, such as 2-methyl-1,6-diaminohexane, and cycloaliphatic diamines, such as di(aminomethyl)cyclohexanediamines. The aliphatic chain can contain hetero atoms, such as sulfur or oxygen, such as represented by 3,3'-ethylenedioxybis(propylamine), and can also bear substituents, such as halogen atoms, which are nonreactive under the conditions of polymerization. Aromatic diamines suitable for use in this invention include diamines wherein R' in the general formula is phenylene, a fused aromatic nuclei, such as represented by biphenylene, bisphenylenemethane, bisphenylenepropane, bisphenylenesulphone, bisphenylene ether, and the like. In addition, any of the aromatic groups may bear one or more nuclear substituents, such as lower alkyl groups or halogen atoms, which are nonreactive under the conditions of polymerization. The diamine preferably contains from 2 to 18 carbon atoms, more preferably 4 to 12 carbon atoms. Particularly suitable diamines include diamines of the homologous series $H_2N(CH_2)_mNH_2$ wherein $m$ is an integer from 2 to 12, preferably 4 to 8, and diamines of the general formula $$H_2N(CH_2)_pZ(CH_2)_qNH_2$$

wherein Z is a phenylene radical and $p$ and $q$ are independently 1, 2 or 3.

Mixtures of diamines can also be used in this invention to produce polymers having recurring units wherein the group represented by R' in the general formula for the polymers refers to two or more different diradicals, as illustrated in Example 5.

The salt can also be copolymerized with other polyamide-forming reactants to produce polymers of such reactants containing recurring units derived from the salt. Suitable polyamide-forming reactants include polyamide-forming aminocarboxylic acids or lactams thereof, such as caprolactam, and polyamide-forming diacids and diamines and salts thereof, such as the salt of adipic acid and hexamethylene diamine. By polymerizing such reactants with the salt of a diamine and a nitrilotricarboxylic acid in accordance with this invention, there is obtained a polymer having improved properties attributable to the recurring units derived from the diamine and the nitrilotricarboxylic acid. For example, the polymer would have improved hygroscopicity and, when quaternized, would have improved antistatic properties. These properties are especially important in fibers.

The polymers of this invention may be quaternized by reaction with a lower alkyl or metal halide in an inert solvent, such as dimethylacetamide. When quaternized, the recurring unit derived from the nitrilotricarboxylic acid and the diamine has the following structure

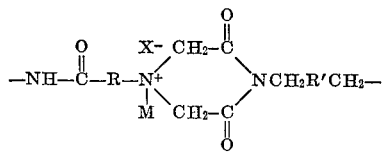

wherein M is a metal or a lower alkyl, and X is a halogen, preferably bromine or iodine. M is preferably a lower alkyl, such as methyl, or a transition metal, such as copper or nickel. When M is a divalent metal, the other valency may be accounted for by another anion, such as a like halogen, in which case M in the above formula includes the other anion. Suitable alkyl and metal halides include methyl iodide, cuprous bromide, and nickel bromide. By employing an alkyl dihalide, such as 1,2-dibromoethane or 1,5-diiodopentane, cross-linking as well as quaternization of the polymer may be effected.

The following examples further illustrate the invention.

EXAMPLE 1

The typical procedure for preparing the polymers of this invention is illustrated for nitrilotriacetic acid and 1,6-diaminohexane. The salt was prepared by combining 10.0 grams of nitrilotriacetic acid and 6.04 grams of 1,6-diaminohexane in 50 ml. of dimethylformamide. The white salt formed immediately and was recovered by filtration. The salt, which had a melting point of 244–245° C., was introduced into a polymerization tube which was subsequently purged with nitrogen, subjected to a vacuum, and sealed. The sealed tube was placed in an oven maintained at 235° C. The tube was removed from the oven after four hours and allowed to cool to room temperature. The polymer was removed from the tube, washed with water, and vacuum dried at 40° C. The polymer weighed 4.6 grams, had an inherent viscosity (0.5% concentration in m-cresol) of 1.02, a glass transition temperature of 65° C. and a melting point of 205° C. The polymer was melted to form a tough, flexible film having a thickness of 5 mils, an ultimate tensile strength of 10,830 p.s.i., an ultimate elongation of 3.3%, and a 1% secant modulus of 417,000 p.s.i. When exposed to air of 100% relative humidity at 25° C., the film absorbed over 20% of its own weight of water in 8 hours, and 65% of its own weight of water in 144 hours.

EXAMPLES 2–5

By the same general procedure, polymers were prepared from nitrilotriacetic acid and the diamines indicated in the table below. The properties of the polymers, all of which were formed into films, are also indicated in the table.

| Diamine | Inherent viscosity (dl./g.) | Tg (° C.) | Tm (° C.) |
|---|---|---|---|
| 1,8-diaminooctane | 0.80 | 68 | 157 |
| 1,2-diaminoethane | 0.25 | 135 | 220 |
| m-Xylylenediamine | 0.40 | 120 | 350 |
| 50 wt. percent 1,2-diaminoethane and 50 wt. percent 1,6-diamino hexane | 0.34 | 83 | 290 |

EXAMPLE 6

Ten grams of a polymer prepared in accordance with Example 1 was 71% quaternized by reaction with 5.62 grams of methyl iodide in dimethylformamide at room temperature. The quaternized polymer was blended with commercially available nylon-6 in an amount of 10% by weight. The blend was formed into four 1 by 10 inch strips of film. The strips were given a static charge of 100 volts and the time of dissipation of the charge to 50 volts was measured. The time of dissipation ranged from 14 to 16 seconds. In comparison, the average time of dissipation for comparable samples of unmodified nylon-6 is about 104 seconds.

We claim:

1. A polymer having recurring units of the formula

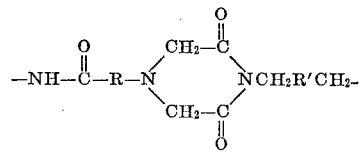

wherein R represents a phenylene radical or an alkylene radical having 1 to 6 carbon atoms and R' represents a covalent bond or an organic diradical.

2. The polymer of claim 1 wherein R' is a covalent bond or an aliphatic, aromatic or aliphatic, aromatic or aliphatic-aromatic diradical having from 1 to 16 carbon atoms.

3. The polymer of claim 2 wherein R is methylene.

4. The polymer of claim 3 wherein R' is a covalent bond or has the formula —$(CH_2)_n$— wherein $n$ is an integer from 1 to 10, or the formula —$(CH_2)_pZ(CH_2)_q$— wherein Z is a phenylene radical and $p$ and $q$ are independently 0, 1 or 2.

5. The polymer of claim 2 quaternized by reaction with a lower alkyl or metal halide.

6. The polymer of claim 5 wherein the lower alkyl or metal halide is a lower alkyl or transition metal bromide or iodide.

7. A method of preparing a polymer having recurring units of the formula

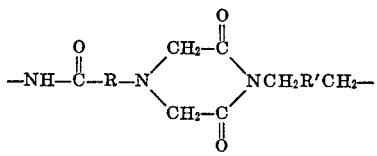

wherein R represents a phenylene radical or an alkylene radical having 1 to 6 carbon atoms and R' represents a covalent bond or an organic diradical, which method comprises maintaining the salt of a substantially 1:1 molar ratio of a nitrilotricarboxylic acid having the formula $(CH_2COOH)_2NRCOOH$, wherein R is as defined above, and a diamine having the formula $NH_2CH_2R'CH_2NH_2$, wherein R' is as defined above at a temperature between about 200° C. and 350° C. and substantially anhydrous until a polymer of film-forming molecular weight is obtained.

8. The method of claim 7 wherein R' is a covalent bond or an aliphatic, aromatic or aliphatic-aromatic diradical having from 1 to 16 carbon atoms.

9. The method of claim 7 wherein R is methylene.

10. The method of claim 7 wherein R' is a covalent bond or has the formula —$(CH_2)_n$— wherein $n$ is an integer from 1 to 10, or the formula —$(CH_2)_pZ(CH_2)_q$— wherein Z is a phenylene radical and $p$ and $q$ are independently 0, 1 or 2.

References Cited

UNITED STATES PATENTS

| | | | |
|---|---|---|---|
| 2,421,024 | 5/1947 | Frosch | 260—78 |
| 3,513,127 | 5/1970 | Marans | 260—78 X |
| 3,515,747 | 6/1970 | Marans | 260—78 X |
| 3,580,891 | 5/1971 | Rainer | 260—78 X |

FOREIGN PATENTS

| | | |
|---|---|---|
| 1,544,632 | 10/1968 | France. |

HOWARD E. SCHAIN, Primary Examiner

U.S. Cl. X.R.

260—30.8 DS, 32.6 N, 47 CP, 78 TF